US012790214B2

(12) United States Patent
Xu et al.

(10) Patent No.: US 12,790,214 B2
(45) Date of Patent: Nov. 10, 2026

(54) METHOD FOR REMOVING IMPURITY MERCURY FROM CRUDE SELENIUM

(71) Applicant: KUNMING UNIVERSITY OF SCIENCE AND TECHNOLOGY, Yunnan (CN)

(72) Inventors: Baoqiang Xu, Yunnan (CN); Huan Luo, Yunnan (CN); Bin Yang, Yunnan (CN); Wenlong Jiang, Yunnan (CN); Lang Liu, Yunnan (CN); Guozheng Zha, Yunnan (CN); Heng Xiong, Yunnan (CN); Yang Tian, Yunnan (CN); Lingxin Kong, Yunnan (CN); Yifu Li, Yunnan (CN); Fei Wang, Yunnan (CN); Jia Yang, Yunnan (CN); Tao Qu, Yunnan (CN); Dachun Liu, Yunnan (CN)

(73) Assignee: KUNMING UNIVERSITY OF SCIENCE AND TECHNOLOGY, Yunnan (CN)

( * ) Notice: Subject to any disclaimer, the term of this patent is extended or adjusted under 35 U.S.C. 154(b) by 408 days.

(21) Appl. No.: 18/691,363

(22) PCT Filed: Mar. 24, 2022

(86) PCT No.: PCT/CN2022/082692
§ 371 (c)(1),
(2) Date: Mar. 12, 2024

(87) PCT Pub. No.: WO2023/035587
PCT Pub. Date: Mar. 16, 2023

(65) Prior Publication Data

US 2024/0375956 A1 Nov. 14, 2024

(30) Foreign Application Priority Data

Sep. 13, 2021 (CN) ........................ 202111070239.2

(51) Int. Cl.
*C01B 19/02* (2006.01)
*B01D 3/10* (2006.01)
*B01D 3/14* (2006.01)

(52) U.S. Cl.
CPC ................ *C01B 19/02* (2013.01); *B01D 3/10* (2013.01); *B01D 3/143* (2013.01)

(58) Field of Classification Search
None
See application file for complete search history.

(56) References Cited

FOREIGN PATENT DOCUMENTS

| | | | |
|---|---|---|---|
| CN | 104775032 | A | 7/2015 |
| CN | 106542507 | A | 3/2017 |

(Continued)

OTHER PUBLICATIONS

Wan et al., Study on Obtaining Pure Selenium by Vacuum Distillation, Journal of Kunming University of Science and Technology, Jun. 2006, 31(3): 26-28, English Abstract included.

(Continued)

*Primary Examiner* — Yun Qian
(74) *Attorney, Agent, or Firm* — Thomas | Horstemeyer, LLP

(57) ABSTRACT

Disclosed is a method for removing impurity mercury from crude selenium. The method includes: mixing a vulcanizing agent with a crude selenium slag that is crushed to not more than 200 mesh uniformly, and performing briquetting to obtain a mixed material; adding the mixed material into a sealed furnace, and subjecting the mixed material to vulcanization by heating under an inert atmosphere to obtain a vulcanized selenium; subjecting the vulcanized selenium to primary vacuum distillation, such that selenium is converted into a gas phase and collected in a form of a volatile, and generated mercury sulfide and valuable elements are (Continued)

enriched in a resulting residue; and subjecting the selenium to secondary distillation to further remove mercury.

17 Claims, 1 Drawing Sheet

(56) References Cited

FOREIGN PATENT DOCUMENTS

| | | | |
|---|---|---|---|
| CN | 108975290 | A | 12/2018 |
| CN | 111330427 | A | 6/2020 |
| CN | 111570469 | A | 8/2020 |
| CN | 113716532 | A | 11/2021 |
| DE | 2558115 | A1 | 6/1977 |
| GB | 1515610 | A | 6/1978 |
| WO | WO 2023/035587 | A1 | 3/2023 |

OTHER PUBLICATIONS

Yang et al., "Recovering Cu from Cu—As—Sb multi-component alloy by sulfuration-vacuum distillation", Journal of Central South University (Science and Technology), Dec. 2012, 43(12): 4610-4616, English Abstract included.

Zhang, "Experimental Study on Recovery of Tellurium from Cadmium Telluride Waste", China's Outstanding Master's Degree Thesis Collection, Apr. 15, 2021, English Abstract included.

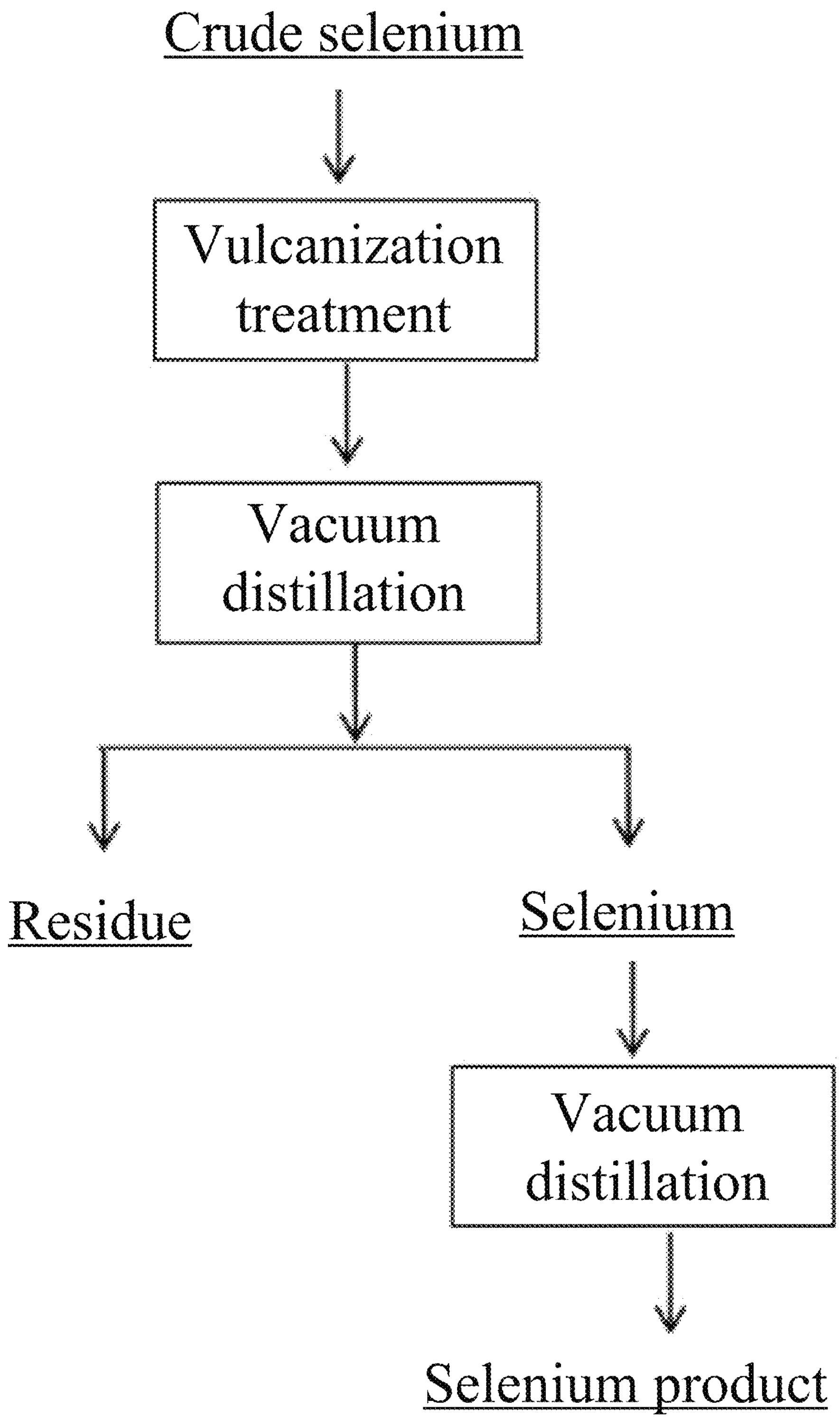
Crude selenium
Vulcanization treatment
Vacuum distillation
Residue
Selenium
Vacuum distillation
Selenium product

METHOD FOR REMOVING IMPURITY MERCURY FROM CRUDE SELENIUM

CROSS REFERENCE TO RELATED APPLICATIONS

The present application is a national stage application of International Patent Application No. PCT/CN2022/082692, filed on Mar. 24, 2022, which claims priority of the Chinese Patent Application No. CN202111070239.2, filed with the China National Intellectual Property Administration (CNIPA) on Sep. 13, 2021, and entitled "METHOD FOR REMOVING IMPURITY MERCURY FROM CRUDE SELENIUM". The disclosures of the two applications are incorporated herein by reference in their entireties.

TECHNICAL FIELD

The present disclosure relates to a method for removing impurity mercury from crude selenium, and belongs to the technical field of purification and impurity removal for scattered metals.

BACKGROUND

Selenium exhibits excellent physical and chemical properties and is widely used in high-tech fields. However, during the purification of selenium, the volatility of mercury results in high mercury content in selenium products, thus seriously affecting the quality of selenium products. Moreover, mercury is classified as a hazardous waste due to its high toxicity and bioaccumulation, and is globally recognized as a threat to human and environmental health. Therefore, the removal of mercury from crude selenium waste is a key issue that needs to be solved urgently in the development of the selenium industry.

At present, the methods for removing mercury from crude selenium mainly include wet precipitation process and fire distillation process. The wet precipitation process has been applied, with a typical process mainly including hydrochloric acid-NaClO oxidation, $Na_2SO_3$ reduction of selenium, and then hydrazine hydrate reduction to obtain Se and $HgCl_2$. This process has high recovery rates of selenium and mercury, but shows shortcomings such as long process flow, high cost, and small market. The fire distillation process is currently the most widely used treatment process for removing harmful impurity mercury from selenium-containing waste materials. This process includes pretreatment (lime addition, granulation, and drying), roasting and distillation, condensation, and purification. Specifically, calcium is added to extract selenium, such that selenium in the material is combined with CaO to form less volatile $CaSeO_3$. In this way, the selenium is separated from mercury and then leached, and the mercury is removed by solution purification while the selenium is reduced by $SO_2$. In this process, a large amount of lime needs to be added to separate the mercury from selenium, which requires a complicated process with high energy consumption and cost.

Chinese patent CN104775032A discloses a method for separating selenium from mercury in an acid mud of acid production during gold concentrate roasting. A concentrated sulfuric acid is added to the acid mud of acid production during gold concentrate roasting to obtain a slurry, a catalyst A is added into the slurry and stirred evenly and subjected to catalytic oxidation roasting, so as to obtain a roasting flue gas and a roasting slag. The roasting flue gas is introduced into a tail gas absorption system with an alkali liquid as an absorption liquid. After flue gas absorption is completed, a mercury concentrate and a selenium-containing alkali solution are obtained to achieve the separation of selenium from mercury. Sulfuric acid is added into the selenium-containing alkali solution to form sulfurous acid, which reacts directly with sodium selenite to produce crude selenium and a reduced solution. The reduced solution is returned to the selenium-containing alkali solution and subjected to secondary reduction. The method in this patent has a complicated process, which requires repeated oxidation-reduction of selenium, thus consuming a large amount of reagents and resulting in a high cost.

SUMMARY

The present disclosure provides a method for removing impurity mercury from crude selenium. This method shows a simple process, safe and controllable procedures, and convenient operations. A direct selenium recovery rate is greater than 98%, and a mercury removal rate is greater than 99.8%.

The present disclosure adopts the following technical solutions: the method for removing impurity mercury from crude selenium includes: mixing a vulcanizing agent with a crude selenium slag that is crushed to not more than 200 mesh uniformly, and performing briquetting to obtain a mixed material; adding the mixed material into a sealed furnace, and subjecting the mixed material to vulcanization by heating under an inert atmosphere to obtain a sulfurized selenium; subjecting the sulfurized selenium to primary vacuum distillation, such that selenium is converted into a gas phase and collected in a form of a volatile, and generated mercury sulfide and valuable elements are enriched in a resulting residue; and subjecting the selenium to secondary distillation to further remove mercuryl.

In some embodiments, the crude selenium slag is crushed to a particle size of not more than 200 mesh. If the crude selenium slag has a particle size within the above mentioned range, it is used directly; and if the crude selenium slag has a particle size that does not meet the above mentioned range, the crude selenium slag is crushed.

In some embodiments, the briquetting is conducted at a pressure of 4 MPa to 8 MPa. The briquetting is to inhibit the volatilization of the vulcanizing agent. In some embodiments, the crude selenium slag and the vulcanizing agent are mixed evenly and then briquetted, thereby increasing a contact area between the vulcanizing agent and mercury selenide and increasing a displacement reaction rate. During vulcanizing and smelting, sulfur changes into a gaseous state and flows between pores of block raw materials, which is beneficial to the contact between reactants.

In some embodiments, a molar ratio of mercury to the vulcanizing agent is in a range of 1:10 to 1:20 during the vulcanization. In some embodiments, the vulcanizing agent is selected from the group consisting of elemental sulfur and a sulfide, and the sulfide is selected from the group consisting of sodium sulfide, ferric sulfide, and ferrous disulfide.

In some embodiments, the vulcanization by heating is conducted at a temperature of 150° C. to 300° C. for 15 min to 60 min.

In some embodiments, the primary vacuum distillation is conducted at a temperature of 240° C. to 280° C. and a pressure of 1 Pa to 30 Pa for 20 min to 100 min.

In some embodiments, the secondary distillation is a secondary vacuum distillation; the secondary vacuum distillation is conducted at a temperature of 200° C. to 250° C. and a pressure of 1 Pa to 10 Pa for 30 min to 60 min.

In some embodiments of the present disclosure, a heating rates for heating to a vulcanization temperature and a vacuum distillation temperature each are in a range of 5° C./min to 25° C./min, preferably 5° C./min to 15° C./min; controlling the heating rates during the vulcanization and the vacuum distillation within the above mentioned range is beneficial to fully reacting between the sulfur and mercury.

In some embodiments of the present disclosure, the crude selenium slag has Se with a mass fraction of 90% to 97%, Hg with a mass fraction of 3,200 ppm, and Pb with a mass fraction of 2% to 2.5%.

In some embodiments of the present disclosure, a product obtained after the vacuum distillation is selenium, and a residue and a volatile are obtained after the vacuum distillation of a vulcanization product. The residue is a substance enriched in mercury sulfide and valuable elements, and the volatile is selenium that escapes upward to a condensation tray in the vacuum furnace and is condensed.

Principle of the present disclosure is as follows: since mercury in crude selenium mainly exists in the form of mercury selenide, a saturated vapor pressure of the mercury selenide is similar to that of selenium, and mercury cannot be removed by single vacuum distillation. Accordingly, by taking advantage of an affinity difference between metallic mercury, selenium and sulfur, or sulfide, mercury and sulfur are more likely to combine and the selenium in mercury selenide can be easily replaced. Moreover, the saturated vapor pressures of the generated mercury sulfide and selenium are quite different. The sulfide product is then subjected to vacuum distillation to separate selenium from mercury sulfide. Eventually, the selenium is converted into a gas phase and collected in the form of a volatile, and generated mercury sulfide and valuable elements are enriched into a resulting residue. A condensate selenium is further subjected to secondary distillation to deeply remove impurity mercury.

Beneficial effects of some embodiments of the present disclosure are as follows: a mixed material is obtained by mixing a vulcanizing agent with a crude selenium slag crushed to not more than 200 mesh uniformly, and performing briquetting. The mixed material is added into a vacuum furnace and heated. Based on the different affinities of metallic mercury, selenium and sulfur, or sulfide, and the different saturated vapor pressures of the generated mercury sulfide and selenium, the selenium and mercury are separated through a vulcanization-vacuum distillation process. The selenium is finally converted into a gas phase and collected in the form of a volatile, and generated mercury sulfide and valuable elements are enriched into a resulting residue. This method has a simple process, safe and controllable procedures, and convenient operations. The final obtained selenium product has a minimum impurity mercury content of 5 ppm that meets the requirements for an impurity mercury content in 3N selenium products, a direct selenium recovery rate of greater than 96%, and a maximum mercury removal rate of 99.8%.

BRIEF DESCRIPTION OF THE DRAWINGS

FIGURE shows a process flow diagram of the method according to an embodiment of the present disclosure.

DETAILED DESCRIPTION OF THE EMBODIMENTS

The method for removing impurity mercury from crude selenium provided by the present disclosure will be clearly and completely described below with reference to the examples of the present disclosure. Apparently, the described examples are merely some rather than all of the embodiments of the present disclosure. All other embodiments obtained by those skilled in the art based on the embodiments of the present disclosure without inventive labour shall fall within the scope of the present disclosure.

Example 1

A method for removing impurity mercury from crude selenium was performed by the following steps:

(1) 50 g of selenium-containing waste (with a mercury content of 3,200 ppm) was crushed into a powder of not more than 200 mesh; the powder was mixed evenly with sulfur (at a molar ratio of mercury to sulfur of 1:10 to 1:20) and then subjected to briquetting at 4 MPa; and a resulting mixed material was added into a sealed furnace, and then subjected to vulcanization for 60 min in an inert atmosphere at 150° C. obtained by heating at 5° C./min to obtain a vulcanization product.

(2) The vulcanization product was directly subjected to vacuum distillation under the following conditions: with a heating rate of 5° C./min, the vacuum distillation was conducted at 240° C. and 1 Pa for 100 min; based on the different affinities of metallic mercury, selenium, and sulfur, and the different saturated vapor pressures of the generated mercury sulfide and selenium, the selenium and mercury were separated through a vulcanization-vacuum distillation process; the selenium was converted into a gas phase and then collected in a form of a volatile, and the generated mercury sulfide and valuable elements were enriched into a resulting residue; 47.87 g of a selenium product was obtained, with a volatilization rate of 91.74%; the volatile selenium was detected, and a mercury content thereof was 74.43 ppm, showing a mercury removal rate of 97.67%.

(3) A condensate selenium obtained by condensing the volatile selenium was subjected to secondary vacuum distillation under the following conditions: with a heating rate of 5° C./min, the secondary vacuum distillation was conducted at 200° C. and 1 Pa for 30 min, so as to obtain 47.6 g of a selenium product, with a volatilization rate of 99.5%; the volatile selenium was detected, and a mercury content thereof was 5 ppm, which meets the requirements for an impurity mercury content in 3N selenium products, showing a mercury removal rate reaching 99.8%.

Example 2

A method for removing impurity mercury from crude selenium was performed by the following steps:

(1) 50 g of selenium-containing waste (with a mercury content of 3,200 ppm) was crushed into a powder of not more than 200 mesh; the powder was mixed evenly with ferric sulfide (at a molar ratio of mercury to ferric sulfide of 1:15) and then subjected to briquetting at 6 MPa; and a resulting mixed material was added into a sealed furnace, and then subjected to vulcanization for 45 min in an inert atmosphere at 200° C. obtained by heating at 10° C./min to obtain a vulcanization product.

(2) The vulcanization product was directly subjected to vacuum distillation under the following conditions: with a heating rate of 10° C./min, the vacuum distillation was conducted at 260° C. and 10 Pa for 80 min; based on the different affinities of metallic mercury, selenium, and ferric sulfide, and the different saturated vapor pressures of the generated mercury sulfide and selenium, the selenium and mercury were separated through a vulcanization-vacuum distillation process; the selenium was converted into a gas phase and then collected in a form of a volatile, and the generated mercury sulfide and valuable elements were enriched into a resulting residue; 48.53 g of a selenium product was obtained, with a recovery rate of 92.71%; the volatile selenium was detected, and a mercury content thereof was 86.72 ppm, showing a mercury removal rate of 95.94%.

(3) A condensate selenium obtained by condensing the volatile selenium was subjected to secondary vacuum distillation under the following conditions: with a heating rate of 10° C./min, the secondary vacuum distillation was conducted at 220° C. and 5 Pa for 40 min, so as to obtain 48.3 g of a selenium product, with a volatilization rate of 99.7%; the volatile selenium was detected, and a mercury content thereof was 7 ppm, which meets the requirements for an impurity mercury content in 3N selenium products, showing a mercury removal rate reaching 99.7%.

Example 3

A method for removing impurity mercury from crude selenium was performed by the following steps:

(1) 50 g of selenium-containing waste (with a mercury content of 3,200 ppm) was crushed into a powder of not more than 200 mesh; the powder was mixed evenly with sodium sulfide (at a molar ratio of mercury to sodium sulfide of 1:10) and then subjected to briquetting at 8 MPa; and a resulting mixed material was added into a sealed furnace, and then subjected to vulcanization for 30 min in an inert atmosphere at 250° C. obtained by heating at 15° C./min to obtain a vulcanization product.

(2) The vulcanization product was directly subjected to vacuum distillation under the following conditions: with a heating rate of 15° C./min, the vacuum distillation was conducted at 280° C. and 20 Pa for 20 min; based on the different affinities of metallic mercury, selenium, and sodium sulfide, and the different saturated vapor pressures of the generated mercury sulfide and selenium, the selenium and mercury were separated through a vulcanization-vacuum distillation process; the selenium was converted into a gas phase and then collected in a form of a volatile, and the generated mercury sulfide and valuable elements were enriched into a resulting residue; 46.25 g of a selenium product was obtained, with a recovery rate of 92.51%; the volatile selenium was detected, and a mercury content thereof was 151 ppm, showing a mercury removal rate of 95.28%.

(3) A condensate selenium obtained by condensing the volatile selenium was subjected to secondary vacuum distillation under the following conditions: with a heating rate of 15° C./min, the secondary vacuum distillation was conducted at 230° C. and 10 Pa for 50 min, so as to obtain 46.1 g of a selenium product, with a volatilization rate of 99.8%; the volatile selenium was detected, and a mercury content thereof was 15 ppm, showing a mercury removal rate reaching 99.5%.

Example 4

A method for removing impurity mercury from crude selenium was performed by the following steps:

(1) 50 g of selenium-containing waste (with a mercury content of 3,200 ppm) was crushed into a powder of not more than 200 mesh; the powder was mixed evenly with ferrous disulfide (at a molar ratio of mercury to ferrous disulfide of 1:20) and then subjected to briquetting at 8 MPa; and a resulting mixed material was added into a sealed furnace, and then subjected to vulcanization for 15 min in an inert atmosphere at 300° C. obtained by heating at 5° C./min to obtain a vulcanization product.

(2) The vulcanization product was directly subjected to vacuum distillation under the following conditions: with a heating rate of 5° C./min, the vacuum distillation was conducted at 280° C. and 30 Pa for 40 min; based on the different affinities of metallic mercury, selenium, and ferrous disulfide, and the different saturated vapor pressures of the generated mercury sulfide and selenium, the selenium and mercury were separated through a vulcanization-vacuum distillation process; the selenium was converted into a gas phase and then collected in a form of a volatile, and the generated mercury sulfide and valuable elements were enriched into a resulting residue; 46.25 g of a selenium product was obtained, with a recovery rate of 96.15%; the volatile selenium was detected, and a mercury content thereof was 201 ppm, showing a mercury removal rate of 93.72%.

(3) A condensate selenium obtained by condensing the volatile selenium was subjected to secondary vacuum distillation under the following conditions: with a heating rate of 10° C./min, the secondary vacuum distillation was conducted at 250° C. and 1 Pa for 60 min, so as to obtain 46.3 g of a selenium product, with a volatilization rate of 99.7%; the volatile selenium was detected, and a mercury content thereof was 18 ppm, showing a mercury removal rate reaching 99.4%.

Example 5

Comparative experiment: 50 g of selenium-containing waste (with a mercury content of 3,200 ppm) was crushed into a powder of not more than 200 mesh; the powder was directly subjected to vacuum distillation under the following conditions: with a heating rate of 10° C./min, the vacuum distillation was conducted at 300° C. and 30 Pa for 30 min, and the selenium was collected in a form of a gas phase volatile. The selenium had a volatilization rate of 64.8% and a recovery rate of 84.6%; detection of the volatile selenium showed that a mercury content is 1,381 ppm, showing a mercury removal rate reaching 43.15%, while other valuable elements were enriched in a resulting residue.

In summary, the present disclosure provides a method for removing impurity mercury from crude selenium, including: mixing a vulcanizing agent with a crude selenium slag that is crushed to not more than 200 mesh uniformly, and performing briquetting to obtain a mixed material; adding the mixed material into a sealed furnace, and subjecting the mixed material to vulcanization by heating under an inert atmosphere to obtain a sulfurized selenium; subjecting the sulfurized selenium to primary vacuum distillation, such that the selenium is converted into a gas phase and collected in a form of a volatile, and generated mercury sulfide and valuable elements are enriched in a resulting residue; and subjecting the selenium to secondary distillation to further remove mercuryl.

In the present disclosure, the method shows a simple process, safe and controllable procedures, and convenient operations. The final obtained selenium product has an impurity mercury content of less than 5 ppm that meets the requirements for an impurity mercury content in 3N selenium products, a direct selenium recovery rate of greater than 96%, and a mercury removal rate of greater than 99.8%. The remaining valuable elements are enriched in a resulting residue.

It should be understood that those of ordinary skill in the art can make improvements or modifications based on the above description, and all these improvements and modifications should fall within the scope of the appended claims of the present disclosure.

What is claimed is:

1. A method for removing impurity mercury from crude selenium, comprising the following steps:

mixing a vulcanizing agent with a crude selenium slag that is crushed uniformly, and performing briquetting to obtain a mixed material; and adding the mixed material into a sealed furnace, and subjecting the mixed material to vulcanization by heating under an inert atmosphere to obtain a vulcanized selenium; subjecting the vulcanized selenium to primary vacuum distillation, such that selenium is converted into a gas phase and collected in a form of a volatile, and generated mercury sulfide and valuable elements are enriched in a resulting residue;

and subjecting the selenium to secondary distillation and during the vulcanization, a molar ratio of mercury to the vulcanizing agent is in a range of 1:10 to 1:20; and the vulcanizing agent is selected from the group consisting of elemental sulfur and a sulfide and wherein the sulfide is selected from the group consisting of sodium sulfide, ferric sulfide, and ferrous disulfide.

2. The method for removing impurity mercury from crude selenium according to claim 1, wherein the crude selenium slag is crushed to a particle size of not more than 200 mesh, and the briquetting is conducted at a pressure of 4 MPa to 8 MPa.

3. The method for removing impurity mercury from crude selenium according to claim 1, wherein the vulcanization by heating under an inert atmosphere is conducted at a temperature of 150° C. to 300° C. for 15 minutes to 60 minutes, with a heating rate of 5° C./minutes to 25° C./minutes.

4. The method for removing impurity mercury from crude selenium according to claim 3, wherein the vulcanization by heating is conducted with a heating rate of 5° C./minutes to 15° C./minutes.

5. The method for removing impurity mercury from crude selenium according to claim 3, wherein the vulcanization by heating under the inert atmosphere is conducted at a temperature of 200° C. to 250° C. for 30 minutes to 45 minutes.

6. The method for removing impurity mercury from crude selenium according to claim 1, wherein the vulcanization by heating is conducted with a heating rate of 5° C./minutes to 15° C./minutes.

7. The method for removing impurity mercury from crude selenium according to claim 1, wherein the vulcanization by heating under the inert atmosphere is conducted at a temperature of 200° C. to 250° C. for 30 minutes to 45 minutes.

8. The method for removing impurity mercury from crude selenium according to claim 1, wherein the primary vacuum distillation is conducted at a temperature of 240° C. to 280° C. and a pressure of 1 Pa to 30 Pa for 20 minutes to 100 minutes, with a heating rate of 5° C./minutes to 25° C./minutes.

9. The method for removing impurity mercury from crude selenium according to claim 8, wherein the primary vacuum distillation temperature is conducted with a heating rate of 5° C./minutes to 15° C./minutes.

10. The method for removing impurity mercury from crude selenium according to claim 8, wherein the primary vacuum distillation is conducted at a temperature of 260° C. to 280° C. and a pressure of 10 Pa to 20 Pa for 40 minutes to 80 minutes.

11. The method for removing impurity mercury from crude selenium according to claim 1, wherein the primary vacuum distillation temperature is conducted with a heating rate of 5° C./minutes to 15° C./minutes.

12. The method for removing impurity mercury from crude selenium according to claim 1, wherein the primary vacuum distillation is conducted at a temperature of 260° C. to 280° C. and a pressure of 10 Pa to 20 Pa for 40 minutes to 80 minutes.

13. The method for removing impurity mercury from crude selenium according to claim 1, wherein the secondary distillation is a secondary vacuum distillation.

14. The method for removing impurity mercury from crude selenium according to claim 13, wherein the secondary vacuum distillation is conducted at a temperature of 200° C. to 250° C. and a pressure of 1 Pa to 10 Pa for 30 minutes to 60 minutes, with a heating rate of 5° C./minutes to 25° C./minutes.

15. The method for removing impurity mercury from crude selenium according to claim 14, wherein the secondary vacuum distillation is conducted at a temperature of 220° C. to 230° C. and a pressure of 5 Pa to 10 Pa for 40 minutes to 50 minutes, with a heating rate of 10° C./minutes to 15° C./minutes.

16. The method for removing impurity mercury from crude selenium according to claim 13, wherein the secondary vacuum distillation is conducted at a temperature of 220° C. to 230° C. and a pressure of 5 Pa to 10 Pa for 40 minutes to 50 minutes, with a heating rate of 10° C./minutes to 15° C./minutes.

17. The method for removing impurity mercury from crude selenium according to claim 1, wherein the crude selenium slag has Se with a mass fraction of 90% to 97%, Hg with a mass fraction of 3,200 ppm, and Pb with a mass fraction of 2% to 2.5%.

* * * * *